3,144,548
APPARATUS FOR ACCUMULATING HEAT LOSS DATA DERIVED FROM WEATHER CONDITIONS

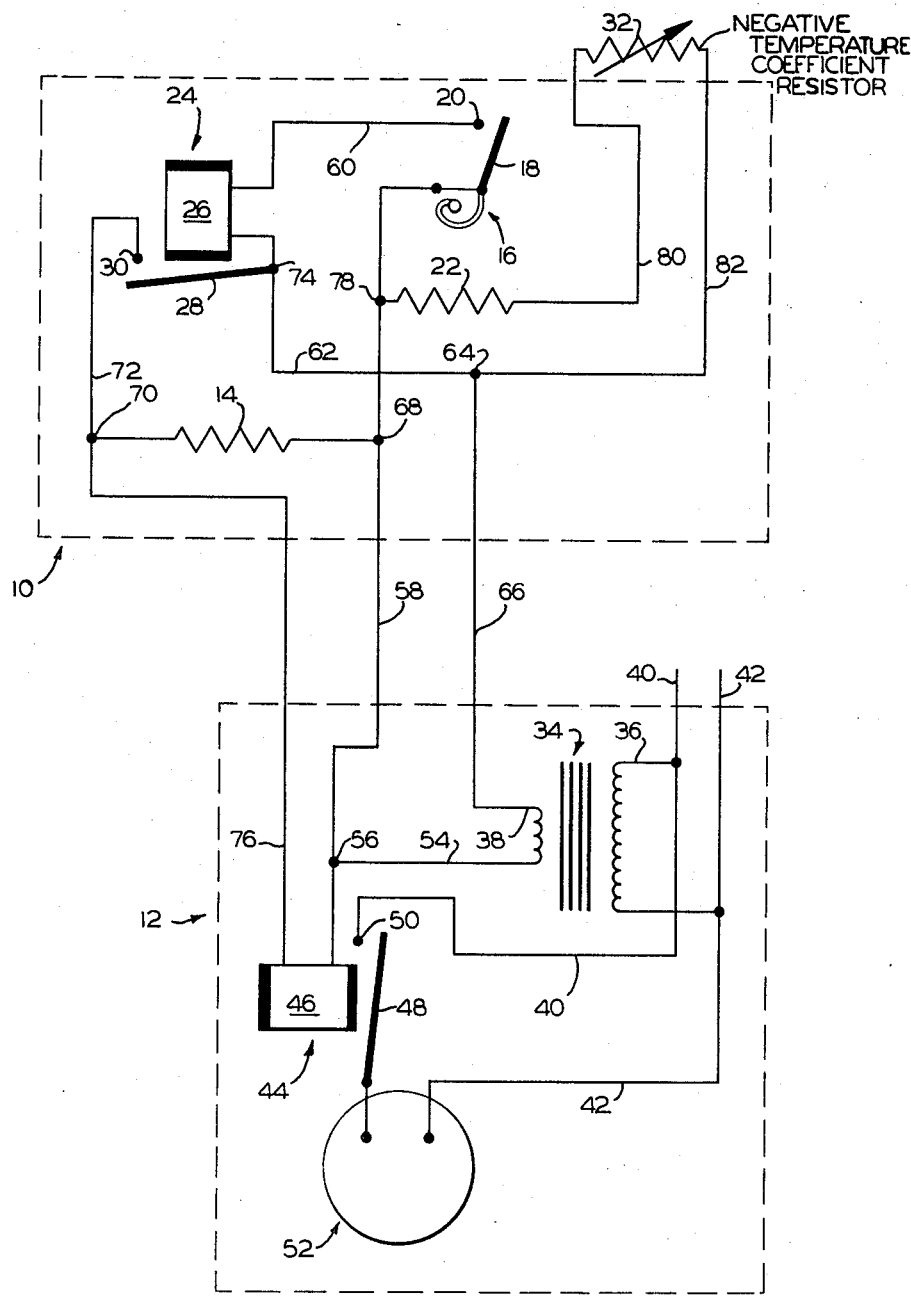

Theodore P. Seigel, Tupper Lake, N.Y.
(Box 221, R.D. 1, Charlton Road, Scotia 2, N.Y.)
Filed Jan. 7, 1960, Ser. No. 1,076
5 Claims. (Cl. 219—505)

This invention relates to an apparatus for accumulating heat loss data for heated buildings as an aid in accurately estimating the fuel delivery requirements of consumers.

The apparatus of the invention is of particular value to fuel oil dealers since it permits the dealers to schedule their deliveries more efficiently. However, the apparatus of the invention is also of value in other applications where accumulated data as to building heat loss would be useful, as, for example, to public utilities supplying natural gas to consumers for heating purposes.

Under presently prevailing practices in the heating fuel oil industry, oil deliveries to consumers are not made on a scientific and efficient basis which accurately takes into account the fuel requirement of the consumers based upon all the various climatic and weather factors which affect the buildings being heated. As a result of insufficient data on the fuel consumption requirements of customers' heating plants, costly and disturbing "run-outs" of fuel frequently occur. Furthermore, under the present system of fuel deliveries, it frequently happens that larger deliveries per truck stop might be made if advance knowledge were available of the fuel required by the customers, based upon heat losses which have occurred since the last delivery.

Accordingly, it is an object of this invention to provide an apparatus for accumulating heat loss data which permits accurate and scientific planning and scheduling of fuel deliveries by heating fuel dealers.

It is another object of this invention to provide an apparatus for accumulating heat loss data for heated buildings which takes into consideration all of the various climatic and weather factors which cause heat losses in the buildings and houses of a given community.

It is still another object of the invention to provide an apparatus for accumulating heat loss data which permits scientific and accurate estimation of consumers' fuel requirements in such manner as to prevent costly and disturbing "run-outs" by customers.

It is a further object of the invention to provide an apparatus for and method of accumulating heat loss data which increases the efficiency of fuel deliveries by providing data permitting scheduling of larger deliveries per fuel truck stop.

Still a further object of the invention is to provide an apparatus for accumulating heat loss data which permits the establishment of a "fuel use rate" factor for each consumer, with any abrupt change in the fuel use rate factor of a given consumer serving as a signal to the dealer that the consumer's heating plant requires service.

In achievement of these objectives, there is provided in accordance with an embodiment of this invention an apparatus for and method of accumulating heat loss data in accordance with which a miniature heated sensing chamber or house is positioned outdoors and provides a heated space which is exposed to the same ambient weather conditions and climatic factors which affect the buildings and houses of fuel consumers in the community, such as rain, snow, hail, wind, sun and humidity. A thermostatic device positioned in the sensing chamber energizes a heating unit in the chamber when the temperature of the sensing chamber drops below a predetermined set value. At the same time a totalizing or read-out device electrically connected to the control devices in the sensing chamber is energized whenever the heating unit in the sensing chamber is energized, thereby totalizing or integrating the time that heat is required in the sensing chamber. To compensate for the fact that consumers set their thermostats higher during the colder weather, means are also provided for in effect resetting the thermostat under cold weather conditions so that a higher inside temperature in the sensing chamber is required to satisfy the thermostat. The reading of the totalizing device is a measure of the total heat input to the sensing chamber during a predetermined interval. By applying a suitable mathematical factor to this reading, an accurate computation of heat lost by houses and buildings of the community during the predetermined interval or period can be made.

Further objects and advantages of the invention will become apparent from the following description taken in conjunction with the accompanying drawing in which the single figure is a schematic wiring diagram of the electrical connections for the apparatus and system of the invention.

Referring now to the drawing, the apparatus of the invention includes a sensing chamber generally indicated at 10 which is positioned out of doors and subjected to the same weather conditions which affect houses and buildings of the community. The sensing chamber is, in effect, a miniature house having heat losses which can be mathematically related to heat lost by the buildings in the community, since it is exposed to the same weather conditions as the buildings in the community. The sensing chamber or miniature house 10 may be considered to be the analog unit of a computing system which accumulates heat loss data derived from weather conditions.

The apparatus or system also includes a read-out or totalizing unit generally indicated at 12 which provides a digital indication of the accumulated heat loss. The read-out unit 12 is electrically connected to the sensing chamber 10 as will be hereinafter described, and is positioned indoors in a location such as the office of a fuel dealer, for example.

Positioned within the sensing chamber 10 is a resistance heating element 14 which serves to heat the chamber, and a heat-responsive bimetal thermostat member generally indicated at 16, including a movable contact element 18 and a stationary contact 20. Heating element 14 may be of any suitable type, such as a resistance coil, plate, or strip, or may be an electric light bulb. A reset heater resistor 22 is located within the housing of thermostat 18 or is otherwise in close heat exchange relation with the thermal responsive element of thermostat 16. Thermostat 16 may be a conventional bimetal strip type thermostat as shown. Alternatively, the thermostat may be any one of the following types: (1) A Bourdon tube type thermostat; (2) an expanding bellows type thermostat; or (3) a potentiometer type thermostat wired into a Wheatstone bridge to operate a relay upon unbalance of the bridge.

Also positioned within sensing chamber 10 is a relay generally indicated at 24 which controls the operation of heating unit 14 and of the totalizing device hereinafter to be described. Relay 24 includes an operating coil 26, a normally open single-pole, single-throw movable contact 28 actuated to closed position by the energization of coil 26, and a fixed contact 30 engaged by relay contact 28 in its closed position. A further component of the apparatus and system is a negative temperature coefficient resistor or thermistor which is located outside of sensing chamber 10 and exposed to all of the weather and climatic conditions to which the sensing chamber or housing 10 itself is subjected. Negative temperature coefficient resistors or thermistors are well known per se.

The components mounted within the read-out or totalizing housing 12 include a step-down transformer generally indicated at 34 including a primary winding 36 and a secondary winding 38. Primary winding 36 is connected to conductors 40 and 42 which, in turn, are connected to a suitable source of alternating current power, such as a 115-volt, 60-cycle power supply. Also located within housing 12 is a relay generally indicated at 44 including an operating coil 46 and a single pole, single-throw normally open movable contact 48 which is moved into engagement with stationary contact 50 of the relay when relay coil 46 is energized.

A totalizing device generally indicated at 52 is positioned in read-out housing 12 to provide a digital read-out of the accumulated heat loss of sensing chamber 10. Totalizing device 52 accumulates units of "On" time of heater 14 in sensing unit 10 and registers continuously and at a constant rate during such time as thermostat 16 in sensing chamber 10 is calling for heat. Totalizing device 52 may be an odometer driven by a constant speed motor which is energized whenever thermostat 16 is closed, as will be explained in more detail hereinafter. However, totalizer 52 could assume other forms as, for example, a pulse counter driven by a pulsing device which could convert the time component into a series of equally spaced pulses, or a revolution counter counting the number of times a motor shaft turns, the motor shaft being energized whenever thermostat 16 is closed.

The circuit connections of the components hereinbefore described and the operation of the system will now be explained:

Thermostat 16 in sensing chamber 10 is electrically connected in series with operating coil 26 of relay 24 across the secondary winding 38 of transformer 34 in such manner that closing of thermostat contact 18 when the thermostat calls for heat is effective to energize relay coil 26. This circuit may be traced as follows: from one end of transformer secondary winding 38 through conductor 54 to junction 56, thence through conductor 58 to movable contact 18 of the thermostat, through contact 20, thence through conductor 60 to one side of relay coil 26, through coil 26 and conductor 62 to junction 64, thence through conductor 66 back to the opposite side of transformer secondary winding 38.

Energization of relay coil 26 by the closing of the thermostat contact 18 is effective to energize the following parallel-connected circuits: (1) the circuit of resistance heating element 14 which heats sensing chamber 10; and (2) the circuit of operating coil 46 of relay 44 which, in turn, is effective to close the circuit of totalizing device 52 in read-out unit 12. These circuits may be traced as follows: Energization of relay coil 26 moves normally open single-pole, single-throw contact 28 of the relay 24 into engagement with fixed contact 30 of the relay. This completes a circuit from one side of secondary winding 38 through conductor 54, junction 56, conductor 58, junction 68, through heating element 14 to junction 70, thence through conductor 72 to stationary contact 30 of relay 24, through movable relay contact 28, which is in closed position, to junction 74, thence through conductor 62, junction 64 and conductor 66 back to the opposite side of transformer secondary winding 38 to complete the energization circuit of heating element 14.

The closing of relay contact 28 is also effective to energize operating coil 46 of relay 44 in read-out unit 12, since coil 46 is connected in parallel with heating element 14 through conductors 58 and 76. Energization of coil 46 of relay 44 moves normally open single-pole, single-throw contact 48 of relay 44 into engagement with fixed contact 50 of the relay. This completes the connection of totalizing unit 52 across conductors 40 and 42 which are connected to a suitable alternating current power supply.

When the temperature of the interior of sensing chamber or housing 10 reaches the set temperature of thermostat 16, thermostat contact 18 opens, thereby opening the energization circuit of operating coil 26 of relay 24. This in turn opens contact 28 of relay 24 and deenergizes both heating element 14 and operating coil 46 of relay 44. Deenergization of operating coil 46 of relay 44 opens relay contact 48 to thereby deenergize the circuit of totalizing device 52.

Thus, the totalizing device 52 is energized whenever thermostat contact 18 is closed and heating element 14 is energized, and the totalizing device 52 is deenergized whenever thermostat contact 18 is open and heating element 14 is deenergized. The totalizing unit thereby provides a digital read-out or count of the total accumulative time that heating element 14 is energized and heat is being supplied to sensing chamber 10. The reading of totalizing device 52 is therefore a measure of the total heat supplied to sensing chamber 14 which, in turn, is a measure of the total heat lost from the chamber. By the application of a suitable empirical mathematical factor, the reading of the totalizing device 52 gives an accurate measurement of accumulated heat losses of typical buildings of the community during a predetermined elapsed period of time.

The accumulated heat loss data provided by the totalizing device 52 of read-out unit 12 is also of value in indicating whether the heating plants of individual customers are properly operating. The data derived from the read-out unit 12 may be used in establishing a "fuel use rate factor" for individual consumers. Any abrupt change in the fuel use rate factor of an individual consumer serves as a signal to the dealer that the customer's heating plant requires service. This feature can be a strong good will building feature for the dealer.

Provision has been made in the heat loss accumulating apparatus and system to compensate for the fact that during cold weather home owners set their thermostats higher, thereby consuming more fuel. This compensating arrangement includes the reset heater resistor 22 which is preferably located within the thermostat housing itself or is otherwise in close heat exchange relation with the thermal sensing element of the thermostat so as to provide what might be considered a variable thermal bias for the thermostat, and a negative temperature coefficient resistor or thermistor 32 which is positioned exteriorly of sensing chamber 10 and subjected to the outside weather and climatic conditions. Negative temperature coefficient resistor 32 and reset heater resistor 22 are connected in series with each other across the output of secondary winding 38, as may be traced in the following circuit: From one side of secondary transformer winding 38 through conductor 54, junction 56, conductor 58, to junction 78, through reset heater resistor 22, through conductor 80 to negative temperature coefficient resistor 32, through resistor 32, through conductor 82 to junction 64, thence through conductor 66 to the opposite side of secondary winding 38. Reset heater resistor 22 continuously gives off heat which correspondingly heats thermostat 16. Thermostat 16 is calibrated to allow for the heat given off by resistor 22 under mild weather conditions, so that thermostat 16 is at its "set point" at such time as the reset heater resistor 22 is giving off heat under mild weather conditions.

Under cold weather conditions, decrease in outdoor temperature, or increased wind velocity, or both, cause the resistance of negative temperature coefficient resistor 32 to increase, since its resistance varies inversely as the ambient temperature. Since negative temperature coefficient resistor 32 is in series with reset heater resistor 22, increase in the resistance of resistor 32 causes less current flow through reset heater resistor 22, and the temperature inside the thermostat housing and of the thermal responsive sensing element of the thermostat falls even though the temperature in sensing chamber 10 is at the "set point" of the thermostat. Thus, in effect, a decrease in outside temperature resets the thermostat 16 so that a higher temperature inside sensing chamber 10 is required to satisfy the thermostat. The thermostat therefore calls for more heat. This increased heat demand is reflected in the accumulated total of the elapsed time meter or totalizing device 52, just as the manual reset of a home owner's thermostat is reflected in the amount of fuel he uses.

It can be seen from the foregoing that there is provided in accordance with this invention an apparatus for and method of accumulating heat loss data derived from weather conditions which has great practical value in that it permits fuel dealers and the like to efficiently schedule their deliveries in such manner as to most efficiently utilize their transportation facilities and to prevent consumers from running out of fuel.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim is:

1. An apparatus for accumulating heat loss data on heated buildings for scheduling fuel deliveries thereto comprising, a relatively small sensing chamber positioned out of doors and exposed to the same weather and climatic conditions as the buildings on which the data is being accumulated, a heat radiating electrical element positioned in said sensing chamber for heating the interior thereof, a thermostat positioned in said sensing chamber for sensing the interior temperature thereof to detect heat losses therefrom, a first relay means including an operating coil and contact means operated to closed position when said operating coil is energized, a source of electrical power, a first electrical circuit including said thermostat and said first relay operating coil connected in series relation across said source of electrical power, said first electrical circuit being energized when said thermostat closes to call for heat in said sensing chamber, a second electrical circuit including said heat radiating electrical element and said first relay contact means connected in series relation across said source of electrical power, said second electrical circuit being energized when said operating coil of said first relay means is energized, a second relay means including an operating coil connected in parallel with said heat radiating electrical element and contact means operated to closed position when said second relay operating coil and said electrical element are energized, and a third electrical circuit including digital totalizing means connected in series with said second relay contact means across said source of electrical power and energized when said electrical element and said second relay means are energized to render a digital indication of heat units supplied to said sensing chamber which when having an empirical mathematical factor for a selected building applied thereto renders a measurement of the fuel consumed by that building in a given time, thus rendering a basis for scheduling fuel deliveries.

2. An apparatus as set forth in claim 1 in which said second relay means and said digital totalizing means are remotely located from said relatively small sensing chamber.

3. An apparatus as set forth in claim 1 including a reset heater resistor positioned in heat exchange relation with said thermostat, and a negative temperature coefficient resistor exposed to the weather and climatic conditions to which said sensing chamber is exposed and connected in series circuit with said reset heater resistor across said first relay operating coil and said thermostat to compensate said thermostat in accordance with ambient weather and climatic conditions.

4. An apparatus as set forth in claim 1 in which said heat radiating electrical element is a resistance coil.

5. An apparatus as set forth in claim 1 in which said heat radiating electrical element is an electric light bulb.

References Cited in the file of this patent

UNITED STATES PATENTS

| | | |
|---|---|---|
| 2,732,132 | Hulett | Jan. 24, 1956 |
| 2,889,991 | Follansbee | June 9, 1959 |

OTHER REFERENCES

John G. Lineville et al.: "Studying Thermal Behavior of Houses," Electronics, McGraw-Hill, June 1944, pp. 117–119 and 362 relied on.

Ralph T. Sqvier et al., Proceeding of the National Electronics Conference, vol. 5, 1950.